Dec. 16, 1941.  R. V. TRADER  2,266,098
AIRPLANE STARTER
Filed April 17, 1940  2 Sheets-Sheet 1
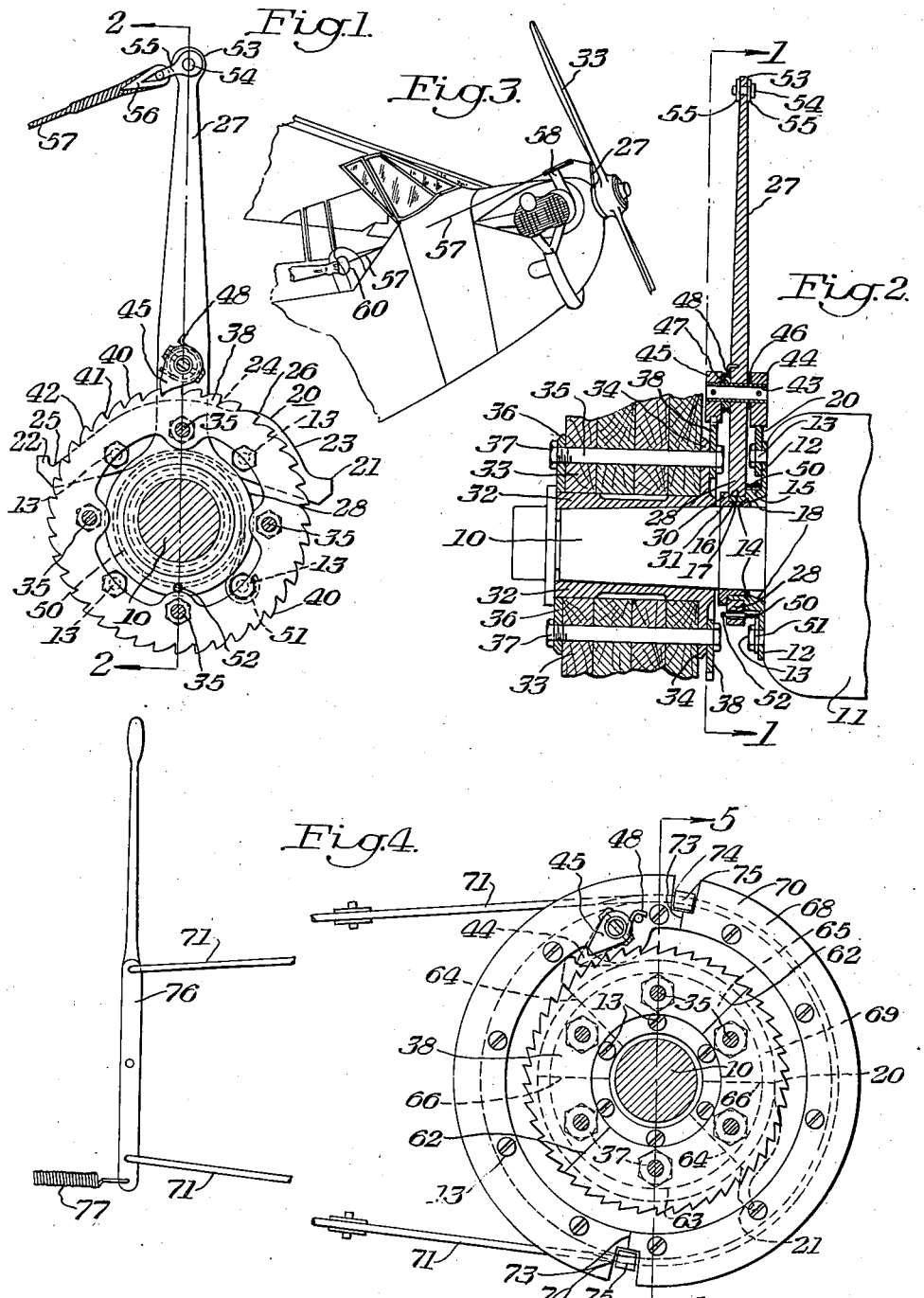

Dec. 16, 1941.  R. V. TRADER  2,266,098
AIRPLANE STARTER
Filed April 17, 1940   2 Sheets-Sheet 2
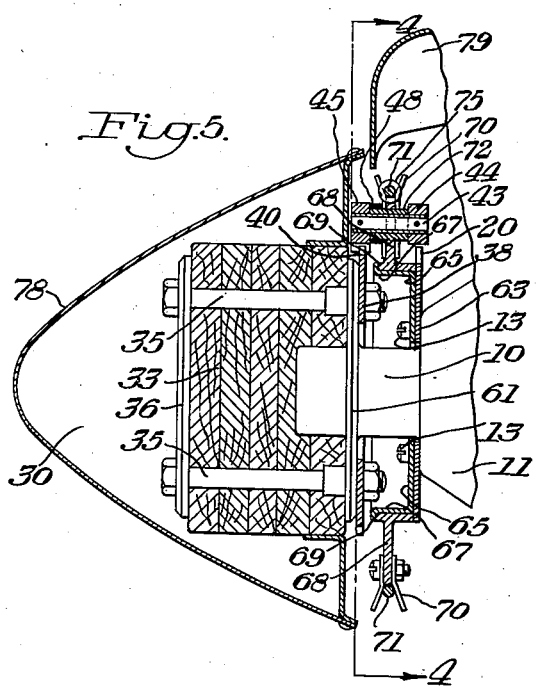
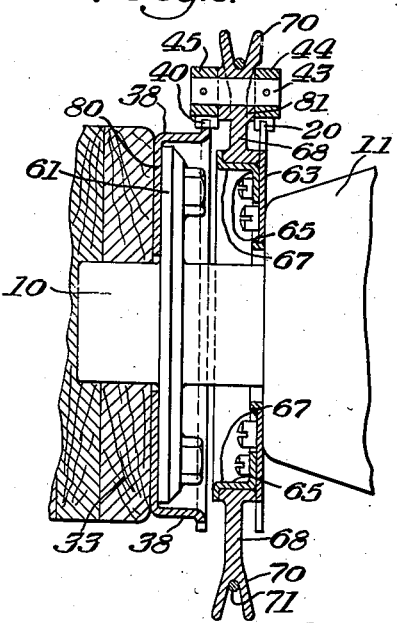
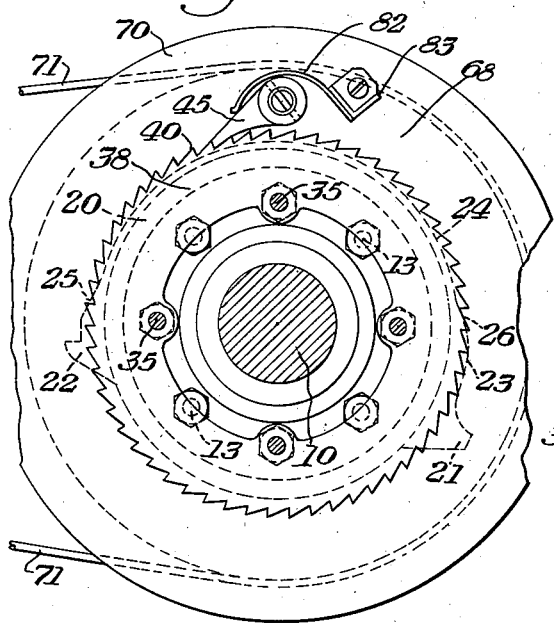
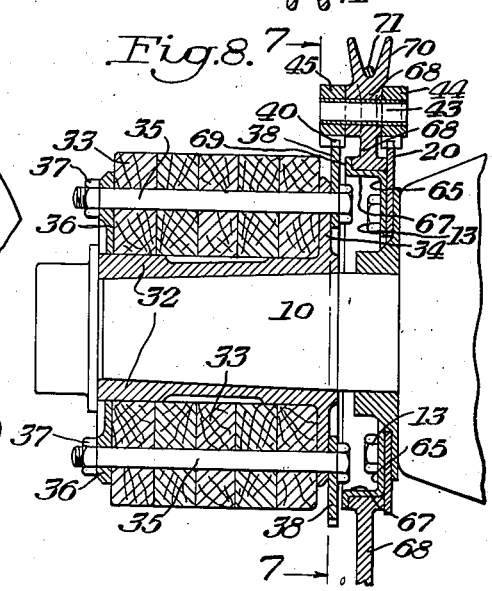
INVENTOR
Russell V. Trader.
BY Edward A. Lawrence
his ATTORNEY Patented Dec. 16, 1941

2,266,098

UNITED STATES PATENT OFFICE 2,266,098

AIRPLANE STARTER

Russell V. Trader, Mifflin Township, Allegheny County, Pa.

Application April 17, 1940, Serial No. 330,115

12 Claims. (Cl. 74—140)

This invention relates generally to airplane motor starters and more particularly to a mechanical motor starter for small airplanes.

The principal object of this invention is the provision of a mechanical engine starter for small airplanes which may be operated from the cockpit, thereby eliminating the danger of being hit by the propeller when cranking the engine by hand. This invention is also advantageous in that the help of a second person is not required for starting the airplane.

Another object is the provision of a mechanical starting device for airplane motors which is simple and economical to manufacture and may be adapted to any small airplane.

Another object is the provision of a mechanical motor starting device which is of such weight that it will not materially change the position of the center of gravity of the plane.

Another object is the provision of a mechanical starting device which enables the pilot to crank a stalled motor while in flight. This is particularly advantageous while landing in airplane when the motor has been throttled to permit gliding and if the motor, being cooled by descent, becomes stalled, by means of my invention it may be quickly cranked and accelerated to avoid a crash.

Another object is the provision of a mechanical motor starting device which becomes disengaged from the rotary parts at either end of the cranking stroke.

Other objects and advantages appear hereinafter in the following description and claims.

In the accompanying drawings a practical embodiment illustrating the principles of this invention is shown wherein:

Fig. 1 is a sectional view, taken on the line 1—1 of Fig. 2, of a starting device having a radial crank arm mechanism and which is mounted on the nose of an airplane motor.

Fig. 2 is a vertical section taken on the line 2—2 of Fig. 1.

Fig. 3 is a perspective view showing the starting device applied to an airplane with parts of the latter being omitted or broken away.

Fig. 4 is a sectional view, taken on the line 4—4 of Fig. 5, of a starting device having a split circular crank arm mechanism mounted on the nose of an airplane motor.

Fig. 5 is a vertical section taken on the line 5—5 of Fig. 4.

Fig. 6 is a partial vertical section of the split circular crank arm mechanism, shown in Figs. 4 and 5, arranged to operate in conjunction with a one-piece ratchet gear.

Fig. 7 is a sectional view, taken on the line 7—7 of Fig. 8, of a starting device having an integral circular crank mechanism.

Fig. 8 is a vertical section taken on the line 8—8 of Fig. 7.

Referring to Figs. 1 to 3, my mechanical airplane starting device is assembled around the motor crank shaft 10 which projects from the nose 11 of the motor casting of the airplane. An annular plate 12 is slid over the end of the shaft 10 and secured to the nose 11 by means of the bolts 13. The plate 12 has an integral collar 14 extending outwardly in coaxial relation with the shaft 10 and which is provided with an external shoulder 15. Adjacent its outer end, the collar 14 is provided with internal and external coaxially concurrent surfaces 16 and 17 respectively. The rest of the bore of the collar is preferably made tapered or frusto-conical as illustrated at 18 in Fig. 2.

A cam plate 20 is secured to the nose 11 of the motor by the bolts 13, which also secures plate 12 in place. The cam plate is provided with a cam track on its outer periphery which extends between the outwardly projecting stops or abutments 21 and 22. The cam surface extends through approximately one hundred and thirty-five degrees and may be divided into three sections 23, 24 and 25. Section 23 is adjacent the abutment 21 and is concentric to the axis of the crank shaft 10 for approximately twenty-five degrees and then curves toward the crank shaft as indicated at 26 and connects with the concentric cam surface 24 which has a smaller radius than the surface 23. The concentric surface 24 extends through an arc of approximately seventy degrees and connects at its other end with the cam surface 25 which is gradually inclined outwardly to the abutment 22. The cam surface 25 at this point is at a distance from the axis of the crank shaft 10, substantially equal in length to the radius of the concentric cam surface 23. The cam surface 25 lies in a plane substantially tangent to the intermediate concentric cam surface 24. If desired these cam surfaces may be formed on the perimetral edge of the plate 12. However the advantage of employing a separate cam plate 20 permits a change in the lengths and radii of the cam surfaces without changing the rest of the mechanism.

The rotary crank in this instance is in the form of a lever 27, provided with a hub 28 having an internal bearing surface arranged to engage the external bearing surface 17 on the collar 14. The hub is held against the step formed by the shoulder 15 on the collar 14 by the radial flange 30 on the sleeve 31. The outer perimetral surface of the sleeve 31 has a press fit with the internal surface 16 of the collar 14 which holds the sleeve from rotating. The bore of the sleeve 31 is larger in diameter than the crank shaft 10 to provide clearance therebetween. The end of the sleeve 31 may extend into the collar 14 to a point adjacent the internal tapered bore 18 and be expanded radially to lock the assembly together.

The hub 28 of the lever is thus held against axial movement but is free to rotate on the bearing surface 17 of the collar 14.

32 represents the hub member of the propeller 33. This member is provided with a tapered bore arranged to fit on the tapered portion of the shaft 10 and is secured thereto in any well known manner. A radially extending annular flange 34 is formed integral with the hub member 32 and is provided with a series of holes for receiving the bolts 35 which pass through the propeller. The bolts extend through aligned holes in the clamping plate 36 and are arranged to receive the nuts 37 for clamping the propeller to the hub 32.

The annular ratchet gear 38 is provided with aligned holes for receiving the bolts 35 which clamp the gear to the flange 34 of the propeller hub, as shown in Fig. 2. This ratchet gear is made from a flat annular ring having the teeth 40 formed in the perimetral surface thereof. The teeth 40 are provided with straight faces 41 which are substantially radial to the axis of the gear. The back of the teeth are arcuate as illustrated at 42 in Fig. 1.

The lever 27 is provided with a transverse opening for receiving the short tubular shaft 43. A cam-follower member 44 is pinned to one end of the shaft 43 while a pawl member 45 is pinned to the other end of said shaft. These members are of substantially the same shape and are preferably aligned on the shaft. These members are maintained in proper spaced relation relative to the lever by the spacer washers 46 and 47. A small coil spring 48 is placed around the washer 47 and is secured at one end to the lever 27 while its other or free end is arranged to bear against the pawl 45, tending to rotate the pawl and the cam follower in a counterclockwise direction in Fig. 1.

The cam follower 44 and the pawl 45 are positioned on the shaft 43 so that their respective engaging portions are aligned with surfaces of the cam 20 and teeth 40 of the ratchet gear. Since the cam follower and the pawl are fixed to the same shaft the coil spring 48 maintains the cam follower in engagement with the cam 20. When the cam follower 44 contacts the concentric cam surface 23 or the outer end of the cam surface 25, the pawl 45 is held out of engagement with the teeth 40 of the ratchet gear, but when the cam follower 44 is traversing the cam surface 24 the pawl engages the teeth of the ratchet gear to their full depth, as shown in Fig. 1, and the cam follower 44 just clears the cam surface 24.

A second coil spring 50 is placed around the shoulder 15 of the collar 14. One end of this spring is secured to one of the bolts 13 as illustrated at 51 in Figs. 1 and 2, and the other end is looped through a hole in the lower end of the hub 28 of the lever 27 as shown at 52. The spring 50 is arranged to rotate the lever 27 in a clockwise direction in Fig. 1 and to maintain the back of the cam follower against the abutment 21 on the cam 20 which represents the normal position of rest of the lever. Thus when the lever is left free to rotate it will swing to the right in Fig. 1 and the cam follower 44 will ride up the inclined arcuate surface 26 to the concentric surface 23, thereby lifting the pawl 45 out of engagement with the ratchet teeth 40.

The outer end of the lever 27 is provided with an eye 53 for receiving the pin 54 which pivotally carries the clevis 55. The bend of the clevis carries an eye 56 around which the end of the cable 57 is threaded and then spliced. This cable then passes over a pulley in the streamlined arm 58 supported on the motor block and from whence it passes back through the fuselage into the cockpit as shown in Fig. 3. A hand ring 60 is secured to the rear end of the cable 57 within convenient reach of the pilot.

When the pilot pulls on the hand ring 60 the lever is rotated in a counterclockwise direction from a position of rest against the abutment 21. The finger of the cam follower then passes off the cam surfaces 23 and 26 and the pawl 45 engages one of the teeth 40 of the ratchet gear. Further pull on the hand ring thus rotates the propeller with the lever 27 until the cam follower 44 rides up the cam surface 25 and lifts the pawl 45 out of engagement with the teeth of the ratchet gear and continues until the cam follower engages the stop 22, preventing further motion of the lever 27. This short rotation of the propeller is sufficient to crank the motor.

When the hand ring is released the lever 27 is returned to its normal position of rest by the spring 50. As the lever moves back the pawl trails idly over the arcuate surfaces 42 of the teeth 40 until the cam follower lifts the pawl out of engagement with the ratchet gear 38 by riding up the inclined cam surface 26.

With this structure the pawl is lifted out of engagement from the ratchet gear at each end of the stroke and it is held out of engagement when the lever is in its normal non-operating position. Since the arcuate movement of the lever 27 is limited there is little chance that a back fire would impair the starting mechanism or injure the operator.

Referring to Figs. 4 and 5, the motor crank shaft 10 is provided with an integral radial flange 61 to which the propeller 33 is secured by means of the bolts 35. This character of structure is used on the Lycoming and Franklin airplane motors and since the ratchet gear 38 is smaller in diameter than the integral flange 61 it is necessary to split the gear along the line 62 so that it may be assembled against the inner face of the flange.

The cam 20 is formed on a portion of the perimetral surface of the plate 63 which is also split along the line 64 for the same reason.

An annular bearing support 65 is assembled against the outer surface of the plate 63 and is held thereto by the bolts 13. This support is also split along the line 66 to permit it to be assembled in back of the flange 61, and it is provided with the cylindrical bearing surface 67 upon which the hub of the rotary crank, which is in the form of a disk 68, is journaled. The disk is held between the radially extending flange 69 on the end of the bearing surface 37 and the peripheral portion of the plate 63 which extends beyond the bearing surface 67.

The perimeter of the circular crank disk is provided with a V-groove 70, which may be formed integral or by means of plates bolted to the disk, for receiving the cable 71.

A transverse hole is cut in the disk 68 and a sleeve 72 is fitted and welded therein. The shaft 43 is journaled in the bore of the sleeve. This shaft carries the cam follower 44 and the pawl 45 as above described. The spring 48 is wound around the sleeve and engages the pawl for holding the cam follower and the pawl against their respective operating surfaces.

The circular crank disc 68 is also split along the line 73 to permit assembly thereof on the cylindrical bearing surface 67.

One or more openings 74 may be provided in the sides of the V-groove 70 for receiving the cable lock or gripper bead 75. This bead is a hollow metal cylinder that is slipped on the cable and when properly positioned for engaging the openings 74 it is tightly swedged to the cable and cannot thereafter be moved relative thereto unless by a distinctive force.

The ends of the cable 71 pass radially off the circular crank disc and are directed by properly positioned idler pulleys to the cockpit of the airplane. A lever 76 pivotally mounted in the cockpit intermediate of its ends has the ends of the cable 71 secured at the opposite sides of the pivotal axis at equal distances. The lever 76 may be held in its normal inoperative position by means of the spring 77 which is a substitute for the spring 50 disclosed above in connection with the preceding views of the drawings. Regardless of which character of spring is employed, sufficient force is applied to the crank to maintain the cam follower 44 in its normal position against the stop abutment 21 on the cam 20.

The starting mechanism of this type may be assembled in back of the streamlined cowling 78 and under the engine cowling 79, thereby completely enclosing the whole of the mechanism from view and within the confines of the streamlining.

The structure illustrated in Fig. 6 is the same as that just described in connection with Figs. 4 and 5, with the exception that the ratchet gear 38 is made from a single plate 80 so that it may be assembled against the front face of the integral flange 61. To properly align the pawl 45 with the ratchet gear, the plate 80 is of cup shape and the teeth 40 are formed on the outer radial flange. This view also shows the V-groove 70 formed integral with the perimetral portion of the circular crank arm 68. A boss 81 is provided in the crank disk to take the place of the sleeve 72 and is bored to receive the shaft 43.

Referring now to Figs. 7 and 8, the structure is the same as that illustrated in Figs. 4 and 5, with the exception that the propeller is secured to the removable hub 32 which in turn is secured to the motor crank shaft 10. In this instance the ratchet gear 38, the plate 63 having the cam track, the bearing member 65 and the circular crank disc 68 are each made in one piece.

The cam surface 24, the length of which determines the duration of engagement between the pawl 45 and the teeth 40 of the ratchet gear 38, extends through an arc of approximately 180 degrees, which is ample length in which to crank an internal combustion engine. This increased length of cable pull may readily be taken up by the use of a differential or mechanical multiplying device through levers or drum mechanism. In each of such instances some means must be provided within the device for holding the crank mechanism in its normal inoperative position. Again one end of the cable may be secured to a helical spring or pass around the crank disk and return to the cockpit where a hand ring is fastened thereto.

A leaf spring 82 is secured to the bracket 83 fastened on the side of the disk 68 and is used for urging the pawl and the cam follower against the ratchet gear 38 and the cam 20 respectively. This leaf spring performs the same function as the coil spring 48 described above.

Various modifications of the herein described structure of the apparatus may be suggested to those skilled in the art, but it is understood that the invention is not limited to the preferred embodiments herein disclosed and various changes may be made within the scope of the following claims.

I claim:

1. In a mechanical motor-starter for airplanes which have a motor provided with a protruding crank shaft for receiving a propeller, the combination of an annular bearing surface fixed relative to the motor and encircling said crank shaft, crank-means arranged for oscillation on said bearing surface, means for operating the crank-means from the cockpit of the airplane, a member arranged to rotate with the crank shaft, and means moving with the crank-means and arranged to operatively engage the member when the crank-means is moving in one direction to rotate the crank shaft and start the engine but to travel idly over the member when the crank-means is moving in the opposite direction.

2. In a mechanical motor-starter for airplanes which have a motor provided with a protruding crank shaft for receiving a propeller, the combination of an annular bearing surface fixed relative to the motor and encircling said crank shaft, crank-means arranged for oscillation on said bearing surface, means for operating the crank-means from the cockpit of the airplane, a member arranged to rotate with the crank shaft, means moving with the crank-means and arranged to operatively engage the member when the crank-means is moving in one direction to rotate the crank shaft and start the engine but to travel idly over the member when the crank-means is moving in the opposite direction, and stationary means for limiting the movement of the crank-means.

3. In a mechanical motor-starter for airplanes having a motor provided with a crank shaft extending therefrom and a propeller secured to the crank shaft, the combination of an annular bearing surface fixed relative to the motor and encircling said crank shaft, crank-means rotatably mounted on said bearing surface, means operable from the cockpit for rotating said crank-means, means operable by said crank-means and arranged to engage and rotate the crank shaft with the crank-means to start the motor, and stationary means arranged to engage the crank-means for limiting its movement in either direction.

4. In a mechanical motor-starter for airplanes comprising a motor having a crank shaft extending therefrom for receiving a propeller, an annular bearing surface fixed relative to the motor and encircling said crank shaft, crank-means rotatably mounted on said bearing surface, means operable from the cockpit for rotating said crank-means, means operable by said crank means arranged to engage and rotate the crank shaft with the crank-means to start the motor, and means for controlling the engagement and disengagement of said crank shaft-engaging means.

5. In a mechanical motor-starter for airplanes comprising a motor having a crank shaft extending therefrom for receiving a propeller, an annular bearing surface fixed relative to the motor and encircling said crank shaft, crank-means rotatably mounted on said bearing surface, means operable from the cockpit for rotating said crank-means, means operable by said crank-means arranged to engage and rotate the crank shaft with the crank-means to start the motor, and means for controlling the engagement and disengagement of said crank shaft-engaging means at both ends of a predetermined arcuate movement of the crank-means.

6. In a mechanical motor starter for airplanes comprising a motor having a crank shaft extending therefrom for receiving a propeller, an annular bearing surface fixed relative to the motor and encircling said crank shaft, crank-means rotatably mounted on said bearing surface, means operable from the cockpit for rotating said crank-means, means operable by said crank-means arranged to engage and rotate the crank shaft with the crank-means to start the motor, and means fixed relative to the motor for controlling the engagement and disengagement of said crank shaft-engaging means and for limiting the movement of the crank-means.

7. In a mechanical motor-starter for airplanes having a motor provided with a crank shaft extending therefrom and a propeller secured to the crank shaft, the combination of an annular bearing surface fixed relative to the motor and encircling said crank shaft, crank-means rotatably mounted on said bearing surface, means operable from the cockpit for rotating said crank-means, means operable by said crank-means and arranged to engage and rotate the crank shaft with the crank-means in one direction to start the motor, and means fixed relative to the motor for controlling the engagement and disengagement of said crank shaft-engaging means at both ends of a predetermined arcuate movement of the crank-means and for limiting the movement of the crank-means.

8. In a mechanical motor-starter for airplanes having a motor provided with a crank shaft extending therefrom for receiving a propeller, the combination of a plate surrounding the crank shaft and secured to the motor, an annular bearing surface carried by said plate, crank-means rotatably mounted on said bearing surface, a pull cord operable from the cockpit and fixed to said crank-means for rotating the same, a ratchet gear fixed to the crank shaft, a pawl carried by the crank-means and arranged to engage the ratchet gear and rotate the crank shaft with the crank-means to start the motor, a cam track carried by said plate, a cam follower mounted to move in unison with the pawl and arranged to engage the cam track to cause engagement and disengagement of the pawl with the ratchet gear at both ends of a predetermined arcuate movement, a stop at each end of the cam track arranged to be engaged by the cam follower for limiting the arcuate movement of the crank arm, and means for returning the crank arm to its normal position determined by the stop at the beginning of its arcuate movement.

9. In a mechanical motor-starter for airplanes which have a motor provided with a protruding crank shaft for receiving a propeller, the combination of an annular bearing surface fixed relative to the motor and encircling said crank shaft, crank-means arranged for oscillation on said bearing surface, means for operating the crank-means from the cockpit of the airplane, a member arranged to rotate with the crank shaft and provided with a toothed portion, a pawl mounted on the crank-means and arranged to engage the toothed portion and rotate the crank shaft when the crank-means is moved in one direction and to trail idly over the same when the crank-means is moved in the other direction, a cam track, and a cam-follower moving in unison with the pawl and arranged to engage the cam track and cause the pawl to move into and out of engagement with the toothed portion of said member at either end of the path of movement of the crank-means.

10. In a mechanical motor-starter for airplanes which have a motor provided with a protruding crank shaft for receiving a propeller, the combination of an annular bearing surface fixed relative to the motor and encircling said crank shaft, crank-means arranged for oscillation on said bearing surface, means for operating the crank-means from the cockpit of the airplane, a member arranged to rotate with the crank shaft and provided with a toothed portion, a cam track fixed relative to the motor, and a unitary rocking member mounted on the crank-means, one portion of the rocking member arranged to engage said toothed portion and rotate the crank shaft when the crank-means is moved in one direction and another portion of the rocking means arranged to engage the cam track and disengage the first named portion of the rocking member from said toothed portion.

11. A cam member for use in a mechanical motor-starter for airplanes which consists of an arcuate plate, means for securing the plate to the nose of the motor, a cam track on the outer periphery of said plate, and outwardly projecting stops on said plate adjacent each end of said cam track.

12. A cam member for use in a mechanical motor-starter for airplanes which consists of an arcuate plate, means for securing the plate to the nose of the motor, a cam track on the outer periphery of said plate having two sections disposed approximately concentric to the shaft of the motor and connected by an inclined surface, a second inclined surface rising from the other end of the innermost concentric surface, and outwardly projecting stops on said plate adjacent each end of said cam track.

RUSSELL V. TRADER.